(12) United States Patent
Nolan et al.

(10) Patent No.: US 9,872,362 B2
(45) Date of Patent: Jan. 16, 2018

(54) GESTURE BASED CONTROL OF A UTILITY

(71) Applicant: PHILIPS LIGHTING HOLDING B.V., Eindhoven (NL)

(72) Inventors: Julian Charles Nolan, Eindhoven (NL); Matthew John Lawrenson, Eindhoven (NL); Alexander Henricus Waltherus Van Eeuwijk, Eindhoven (NL); Hilbrand Vanden Wyngaert, Eindhoven (NL); William Nathan Chelton, Eindhoven (NL)

(73) Assignee: PHILIPS LIGHTING HOLDING B.V., Eindoven (NL)

( * ) Notice: Subject to any disclaimer, the term of this patent is extended or adjusted under 35 U.S.C. 154(b) by 0 days.

(21) Appl. No.: 15/114,396

(22) PCT Filed: Jan. 16, 2015

(86) PCT No.: PCT/EP2015/050721
§ 371 (c)(1),
(2) Date: Jul. 26, 2016

(87) PCT Pub. No.: WO2015/113833
PCT Pub. Date: Aug. 6, 2015

(65) Prior Publication Data
US 2016/0345407 A1    Nov. 24, 2016

(30) Foreign Application Priority Data

Jan. 30, 2014 (EP) ..................................... 14153288

(51) Int. Cl.
*G06F 3/033* (2013.01)
*G08C 17/02* (2006.01)
(Continued)

(52) U.S. Cl.
CPC ......... *H05B 37/0227* (2013.01); *G06F 3/017* (2013.01); *G08C 17/02* (2013.01);
(Continued)

(58) Field of Classification Search
CPC . H05B 37/0227; H05B 37/0272; G06F 3/017; G08C 17/02
See application file for complete search history.

(56) References Cited

U.S. PATENT DOCUMENTS

2006/0182346 A1    8/2006  Yoda et al.
2011/0119640 A1*   5/2011  Berkes ................... G06F 3/011
                                                          715/863
(Continued)

FOREIGN PATENT DOCUMENTS

DE    102010032761 A1    2/2012
EP         0919906 A2    6/1999
(Continued)

*Primary Examiner* — Tung X Le
*Assistant Examiner* — Raymond R Chai (57) ABSTRACT

A controller, method and program for controlling one or more sources of a utility to provide the utility into a space occupied by one or more users, e.g. for controlling light sources illuminating an indoor or outdoor space. An input from one or more sensors is processed to detect motions of a user in the space, to detect that the motions correspond to predetermined gestures performed by the user, and to detect a position from which each gesture was performed. Further, each of a plurality of discrete control policies is associated with a respective combination of predetermined gesture and positional demarcation within the space. Each control policy defines a respective response of the utility to the respective associated gesture. For gestures performed from each of a plurality of different positions, a different control policy is selected based on being associated with the detected gesture and detected position.

14 Claims, 4 Drawing Sheets

(51) Int. Cl.
    *H05B 37/02*         (2006.01)
    *G06F 3/01*          (2006.01)

(52) U.S. Cl.
    CPC ..... *H05B 37/0272* (2013.01); *G08C 2201/32* (2013.01); *Y02B 20/44* (2013.01)

(56) References Cited

U.S. PATENT DOCUMENTS

| | | | |
|---|---|---|---|
| 2011/0234492 A1* | 9/2011 | Ajmera | G06F 3/017 345/158 |
| 2012/0019168 A1 | 1/2012 | Noda et al. | |
| 2012/0319596 A1 | 12/2012 | Nanahara et al. | |
| 2013/0002551 A1* | 1/2013 | Imoto | G06F 3/013 345/158 |
| 2014/0267008 A1* | 9/2014 | Jain | G06F 3/017 345/156 |
| 2015/0208490 A1* | 7/2015 | Bishop | G08C 17/02 315/153 |

FOREIGN PATENT DOCUMENTS

| | | | | |
|---|---|---|---|---|
| EP | 2410822 A2 | 1/2012 | | |
| WO | 2011001320 A1 | 1/2011 | | |
| WO | 2013175341 A2 | 11/2013 | | |
| WO | WO 2013175341 A2 * | 11/2013 | ............ | G06F 3/017 |

* cited by examiner

GESTURE BASED CONTROL OF A UTILITY

CROSS-REFERENCE TO PRIOR APPLICATIONS

This application is the U.S. National Phase application under 35 U.S.C. § 371 of International Application No. PCT/EP2015/050721, filed on Jan. 16, 2015, which claims the benefit of European Patent Application No. 14153288.7, filed on Jan. 30, 2014. These applications are hereby incorporated by reference herein.

TECHNICAL FIELD

The present disclosure relates to the control of a utility such as lighting through the detection of physical gestures performed by a user.

BACKGROUND

Over the past few years, products such as games consoles and more recently the mobile phone have introduced gesture control to a consumer audience. For example, gesture control can be used to turn a device on and off using a hand gesture, or to control a character in a video game based on a user's own bodily motion.

Gesture control is based on gesture recognition, which can be implemented using one or a combination of various technologies. One such technology is depth-aware image sensing, which is able to produce a 3D image based on time-of-flight information. For example a 3D camera will not only capture visible light over a two-dimensional pixel array, but will also augment this with time-of-flight information for the light received at some or all of the pixels. Another possibility is to use an image recognition algorithm to recognise a gesture in an image captured from a conventional 2D camera. Yet another possibility is to detect motion based on one or more accelerometers and/or rotational sensors such as gyroscopes or magnetometers disposed about a user's person, whether being worn or held by the user.

A gesture is an action performed explicitly by a human user for the purpose of signalling an intention to control some system or apparatus. Further, the term "gesture" as used herein refers to motion of at least one bodily member through the air (or other fluid medium of the space the user is occupying, e.g. water). As such it excludes an action detected purely by detecting the bodily member in question being pressed or held against a button or a control surface such as a touch screen, pressure pad or track pad (whether directly or indirectly via an implement such as a stylus). It also excludes detection purely based on moving a sensing device over a surface while in contact with that surface, e.g. a mouse. Rather, detecting a gesture means detecting the motion of the user by means of a contactless or non-tactile sensing principle. In the case of two- or three-dimensional image recognition, the detection may be achieved without the user necessarily needing to touch any controller device at all. In the case of a sensor or sensors disposed about the user's person, e.g. one or more accelerometers worn on a wristband or carried as part of handheld controller, the user does touch the device housing the sensor(s) but the sensing mechanism itself is based on a non-tactile principle in that the device and sensor move with the gesture formed by the user's bodily member, e.g. as is the case with a gesture-based games controller. This may be contrasted with a tactile principle of sensing whereby the action is detected by the bodily member or implement moving over the sensor surface while in contact, and/or being pressed against the sensor while the device housing it remains still or is braced to resist that pressure, as is the case with pressing a button or operating a touch screen.

One application of gesture control is to control the lighting in a space such as a room. US2012/0019168 discloses embodiments of a system in which lighting is controlled either based on gestures or other types of action. According to US'168, an image from a camera is analysed to determine a type of action being performed by a user, and also to determine the coordinates of the user within a room. In one embodiment of US'168, the detected action is not an explicit gesture but rather whether the user is walking, reading, writing or operating a personal computer. In this embodiment the lights are turned on only in a zone where the user is detected, or the lights are turned on in a distribution around the user such that the brightness of the different lights decreases with their distance from the user's detected coordinates. The brightness in the zone or overall brightness of the distribution depends on the type of action, e.g. whether walking or sitting at a PC. In another embodiment of US'168, the system does work based on gesture control: the user raises his or her hand to turn the lights on, and lowers the hand to turn the lights off. In this embodiment the detected coordinates of the user are used as "marker information" to aid the system in learning the gesture.

SUMMARY

Even if one were to combine gesture control with a particular response such as the lights being dimmed in a distribution around the user, then a given gesture would still always have the same response or function wherever the user went within the space in question. E.g. wherever the user went, the raising or lower of the hand would still always simply perform the same function of raising or lowering the lights in a distribution around the location of the user.

It is recognised herein on the other hand, that it would be desirable if not only the lighting itself were controlled based on gesture and position, but also if the way in which gesture controls the lighting could also vary in dependence on the user's position. Accordingly, in the following disclosure, different control policies are applied depending on user position, where each policy defines a different respective response of the lighting to a gesture. I.e. each control policy controls the output of the system as a different function of gesture, and different functions of gesture are provided for different user positions. The term "position" as used herein may refer to location and/or orientation, so for example different responses may be assigned to different zones within a room or other space, and/or the response may depend on the direction the user is facing in.

Thus advantageously, a gesture can be interpreted in dependence on the detected position of the user, such as to assign a meaning that is most appropriate to the current position from which the user performs the gesture. For instance a user performing a certain gesture at the entrance of a room may wish to dim all the light sources in the room uniformly, while a user sitting at a desk may wish to dim only the light sources around the desk and/or to dim the light sources according to a brightness distribution around the desk. Or as another example, a user may wish to dim only those light sources within his or her field of view, unless no light sources are in the user's field of view in which case an alternative policy may be applied. Policies defining other responses may also be provided. Further, similar principles could also be applied to the control of other utilities such as heating or air-conditioning.

Hence according to one aspect disclosed herein, there is provided a controller for controlling one or more sources of a utility to provide the utility into a space occupied by one or more users. In embodiments the one or more sources are light sources, and the utility they provide is the illumination of the space. The controller comprises motion detection logic, positioning logic, control policy selection logic, and command logic configured to operate as follows.

The motion detection logic processes an input from a sensor to detect motions of a user in said space, and also to detect that the motions corresponds to predetermined gestures performed by the user. For instance the gesture may comprise raising or lowering a hand, or drawing a shape in the air.

Further, the gestures are performed from different respective positions in said space, and the positioning logic processes an input from a sensor to detect the position from which each of said gestures was performed by the user, e.g. the approximate location and/or orientation at which the user is detected to be standing or sitting when he or she performs the gesture.

The control policy selection logic is configured to operate based on a means of association such as a look-up table, algorithm or other logic, which associates each of a plurality of discrete control policies with a respective combination of predetermined gesture and positional demarcation within said space. Each control policy defines a respective response of said utility to the respective associated gesture. Based on this association, the logic selects one of the control policies that is associated with the detected gesture and detected position, different ones of the control policies being selected for the detected gestures performed from each of the different detected positions in dependence on the respective detected position. The command logic then controls the one or more sources to provide the utility in accordance with the respective response of the selected control policy.

In the case where the sources are light sources, the utility provided is the illumination of the space, e.g. an indoor space comprising one or more rooms and/or corridors, or an outdoor space such as a garden or park.

In embodiments, the response defined by at least one of the control policies is a matter of degree which depends on a magnitude of the detected gesture. For example the distance through which a user raises or lowers his or her arm may correspond to the amount by which the intensity of one or more light sources is dimmed up or down. Another example would be the angle of an arc through which the user draws a circular motion in the air, which could control the amount of dimming or a variation in some other variable such as colour temperature.

In embodiments, as well as the selection of the control policy being based on the detected position, the respective response defined by at least one of the control policies comprises a spatial distribution in the provision of said utility within said space wherein the spatial distribution is also a function of the detected position. I.e. the response defined by at least one of the policies is a function of both gesture and user position, in addition to the question of which policy is selected also being a function of position. For example, at least one policy may define a response whereby a plurality of light sources are dimmed in a distribution around the user's location, the distribution being such that the brightness of the sources decreases with their separation from the user's position. One or more other policies may not define such a spatial distribution, e.g. with at least one policy varying all the light sources in the relevant space uniformly.

In embodiments, at least two different control policies may be associated with the same predetermined gesture but different respective positional demarcations, such that the same gesture is interpreted differently depending on position. For instance raising or lower a hand may dim the lights up or down according to one function of the gesture when the user is located in one zone and/or orientated in one direction, while the same gesture dims the lights up or down according to a different function of that gesture when the user is located in a different zone or orientated in a different direction.

As mentioned, the positional demarcation may comprise either a demarcation in location and/or orientation of the user. For example there may be defined different zones, such as a macro zone which controls light sources uniformly and/or controls all the lights in a space, and a non-macro zone which controls only a subset of the light sources within a certain range of the user's position and/or controls light sources according to a spatial distribution whereby intensity decreases with separation from the user's position. Alternatively or additionally, there may be defined different directional demarcations such as demarcations based on the user's field of view. E.g. when one or more light sources in a space are within the user's field of view then the gesture may control those light sources (in favour of those not in the user's field of view), while when no light sources are in the user's field of view then a default control policy may be applied (such as that only the one or a subset of the light sources nearest to the user are controlled by the gesture). In embodiments, the control of the light sources in the user's field of view may be performed based on a spatial distribution whereby intensity decreases with separation from the user.

In yet further alternative or additional embodiments, there may be provided other control policies associating other responses, positional demarcations and/or gestures. Further, policies may be either preconfigured or user-defined (by a commissioning user or end-user). For example a user could choose to associate one control function with drawing a certain shape in the air (e.g. a square) in one part of a room or facing in one direction, and to associate a different control function with the same or a different shape (e.g. a triangle) drawn while in another part of the room or facing in another direction.

According to a further aspect disclosed herein, there is provided a computer program product configured so as when executed on one or more processing units to perform operations implementing any of the logic or operations mentioned above.

BRIEF DESCRIPTION OF THE DRAWINGS

For a better understanding of the present disclosure and to show how it may be put into effect, reference is made by way of example to the accompanying drawings in which.

DETAILED DESCRIPTION OF PREFERRED EMBODIMENTS

The following describes embodiments of a lighting system which automatically selects between different control policies, i.e. different ways in which one or more gestures control the lighting, in dependence on a position from which the user is sensed to have performed the gesture. The selection of the control policy may depend on which of a plurality of predetermined zones the user is found to be located, and/or on which direction the user is facing. Further, in one or more zones and/or when the user is facing in one or more particular directions, the control is not binary, but rather the effect a gesture has on the lighting system relates to the magnitude of the gesture and/or the distance of the user from one or more of the light sources being controlled. For instance, the influence the user's gesture can exert on a plurality of the system's light sources may vary progressively according to how much each light source affects the illumination at user's location (a light source that is further away from the user accounts for less of a contribution to the illumination provided at the user's location, and as such the system is arranged such that, reciprocally, the user's gesture will have less influence on the light sources that are further away than those that are nearer). In embodiments, one or more of the control policies may also take into account the location of the user versus the location of other users in the same space, such that the influence a user's gesture has on each light source depends on the user's location relative to the one or more other users as well as the location relative to the light source and the magnitude of the gesture. Further, the distance of the user from one or more light sources may also influence which functions the user is granted access to.

In embodiments, the system determines the location of a user A from lamps B comprised by a lighting system C. The system initially determines the respective locations of all lamps Y comprised by lighting system C, either through the commissioning process or techniques such as triangulation. Policies are created which specify a mapping between: (i) the position of the user A, (ii) the distance of the user from each lamp B, (iii) the gesture performed by the user, and (iv) the change in the lamp characteristics to be effected. The system may also apply an arbitration between multiple users A1 and A2 (for example).

The lighting system comprises a sensing system based on time of flight (ToF) sensing and/or any other suitable type of sensing technology. This is used to detect the relative location of users to light sources, and to detect the gestures which are being made. This information may then be combined with the location of the light sources to determine which policies should be adopted over time. The characteristics defined in the policies may be uploaded to the lighting controller as changes are made.

The absolute location of users in the space may also be detected either by ToF or other means, such as a mobile user terminal or other device disposed about the user's person. This absolute location may be used to determine whether the user is in a certain allocated zone, e.g. a "macro zone". Macro zones are zones disclosed herein, which may be set aside to have "macro" function irrespective of the user's distance from the lighting system. An action performed by the user in a macro zone is applied to the entire area associated with the macro zone. For example, someone standing at the entrance to an office may have complete control of all the office lights, despite being outside of the main floor of the office where the gestures made by the user may be proportionally interpreted according to the proximity and/or orientation of a user relative to light sources of the system. In both the macro and proportional zones the lighting may also be controlled in proportion to a magnitude of the gesture. Note that "proportional" as used herein does not necessarily mean proportional in the strict mathematical sense, i.e. not necessarily a linear relationship between any two quantities such as intensity and the distance a hand is moved (though such a relationship is one possibility).

It should be noted that the system is not simply based on either receiving or not receiving a signal (as may be the case with a remote control). Rather the system provides gesture control based on time-of-flight (ToF) or similar technology, and as such there is an expectation that a signal (the photon emitted from the source of illumination) will be received by a photon detector, with the time of travel proportional to the depth of the object relative to the ToF photon source/sensor. In this implementation, a look-up table can be used to store the light settings which relate to different zones or user distances from the light source, and different gestures. Accordingly the particular location referenced in the look-up table can depend partly on the relative location of the user from the light source, and partly on the control request (gesture).

Figure 1:
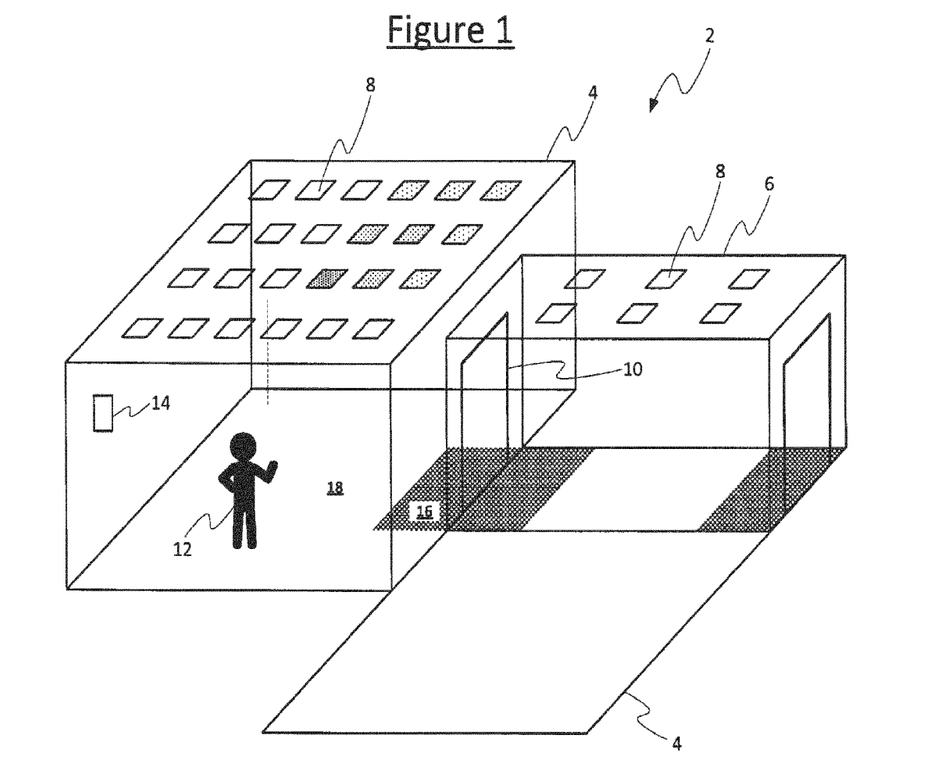
FIG. 1 schematically illustrates an environment comprising a space occupied by a user, FIG. 2 schematically illustrates a time-of-flight based sensing system.
Figure 3:
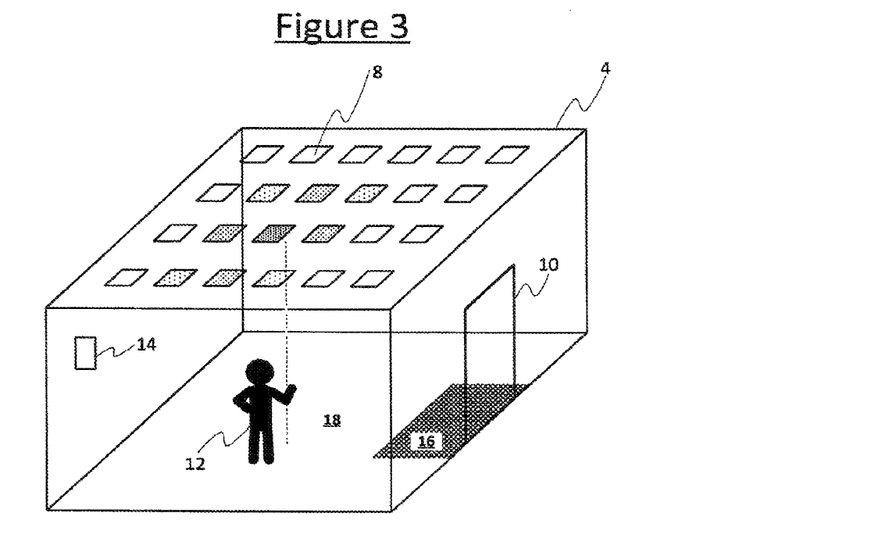
FIG. 3 is another schematic illustration of a space occupied by a user.

FIGS. 1 and 3 provide schematic illustrations of an environment 2, which may comprise an indoor environment such as one or more rooms 4 and/or corridors 6 of a building such as an office, and/or an outdoor environment such as a garden or park. The environment 2 is installed with a lighting system comprising a plurality of light sources 8. A light source 8 may refer to a luminaire comprising one or more lamps, or to an individual lamp of a luminaire. For example the light sources may be mounted on the ceiling, walls, floor or ground, or may be disposed elsewhere such as in free-standing units.

The environment 2 provides a space occupied by a user 12, and that space is illuminated by at least some of the light sources 8. The space in question may refer to the whole environment 2 or an area within that environment. For example in the case of the interior of a building, the space in question may be a single room 4 or corridor, an area within a room 4 or corridor 6, or any combination of one or more rooms 4 and/or corridors 6 or areas within them. For the purpose of illustration, in the following discussion the space will be a room 4, such that where reference is made to all the light sources in the space or illuminating the space or the like, this refers to all the light sources in or illuminating the relevant room 4. However, it will be appreciated that in other embodiments the control may be set-up to operate based on any other spatial apportionment in the environment 2 or across the whole environment 2.

The lighting system also comprises a sensing system in the form of at least one sensor 14, in embodiments a time-of-flight imaging sensor. The one or more sensors 14 are arranged to detect the position of a user 12 within the space 4 (e.g. room), and to detect a gesture performed by the user 12 at that position within the space 4. Further, the space 4 may be sub-divided into a plurality of discrete zones 16, 18, corresponding to different sub-areas of the space 4 in which the user may be detected to be located based on the sensing by the sensor 14. For example in one embodiment the zones comprise a first zone 16 which acts as a "macro" zone in a sub-area around the entrance 10 to the room 4, while the remainder of the room 4 is designated as a second zone 18 which acts as a "proportionate" or "selective" zone. These will be discussed in more detail shortly.

Figure 2:
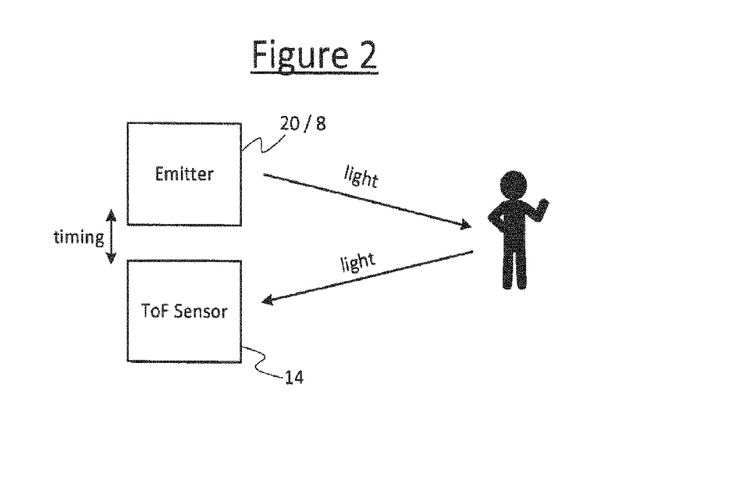

Referring to FIG. 2, in embodiments the sensor 14 comprises a time-of-flight sensor, comprising a time-of-flight sensing element 42. The time-of-flight sensing element 42 is able to sense radiation emitted from an emitter, and this sensing is synchronised with the emission of the radiation from the emitter. The emitter may be a dedicated emitter 20 which may be considered part of the sensor 14 (as illustrated). In this case the emitted radiation may be radiation other than visible light, e.g. infrared, RF or ultrasound, in order not to intrude upon or be confused with the visible light in the space 4; or the radiation could be visible light modulated with an identifiable signal to distinguish it from the rest of the light in the space 4. Alternatively the radiation used in the time-of-flight sensing may be from an incidental source such as one or more of the light sources 8 which are already emitting visible light into the space for the purpose of illumination.

Some of the emitted radiation will be reflected from the user 12 back towards the sensor 14. As it is synchronised with the emission, the sensor 14 can be used to determine the amount of time between emission from the emitter 20 and reception back at the sensing element 42, i.e. time-of-flight information. Further, the sensing element 42 takes the form of a two-dimensional pixel array, and is able to associate a time-of-flight measurement with a measurement of the radiation captured by some or all of the individual pixels. Thus the time-of-flight sensor 14 is operable to capture a depth-aware or three-dimensional image of the space 4, including the user 12 and his or her gestures. In the case where the sensing element 42 captures visible light, the time-of-flight sensor may also be referred to as a depth-aware or 3D camera. By applying image recognition to the depth-aware or 3D images captured by the sensor 14, it is possible to detect information such as the location of the user 12 in the space 4, the direction in which he or she is facing, and/or the gesture he or she is performing. Details of time-of-flight based image sensing in themselves will be familiar to a person skilled in the art.

In embodiments, the sensing system 14 may alternatively or additionally comprise one or more other sensors. For example the sensing system may comprise one or more further time-of-flight imaging sensors disposed at other points in the space 4, and the information from the sensors may be used together to detect user position and/or gestures. Alternatively or additionally, the sensing system 14 may comprise one or more other types of sensor. For example, one or more two-dimensional cameras may be used in conjunction with image recognition techniques to detect user position and/or motion. As another example, one or more accelerometers and/or rotational sensors disposed about a user's person may be used to detect gestures, with the sensed information being relayed back from the sensor to the lighting system via a wireless connection such as Bluetooth or Wi-Fi.

In yet another example, a location system may be used to detect the user's location by detecting the location of a device (e.g. a user terminal such as a mobile phone) disposed about the user's person. Such location systems work by detecting the location of the mobile device relative to a plurality of wireless nodes based on measurements such as time of flight and/or signal strength, typically based on triangulation or more generally multilateration. E.g. the position may be determined relative to satellites in the case of a satellite location system such as GPS, and/or may be determined relative to ground-based anchor nodes such as cellular base stations, WLAN access points or dedicated anchor nodes. Another example is to use an inertial navigation system which combines a location system such as GPS with accelerometers. This can then be used to determine the direction the user most commonly travels in (which will be forwards) to calibrate the system, and then from this determine his or her forward facing direction at the moment of control gesture.

The sensor(s) 14 used for motion and position detection may comprise one or more of the same sensors, e.g. time-of-flight or camera with image recognition; or different sensors, e.g. GPS for position and accelerometers for gesture. Generally, any combination of any of the above technologies may be employed in the sensor system 14 to detect the user's position and gestures performed by the user 12.

Figure 4:
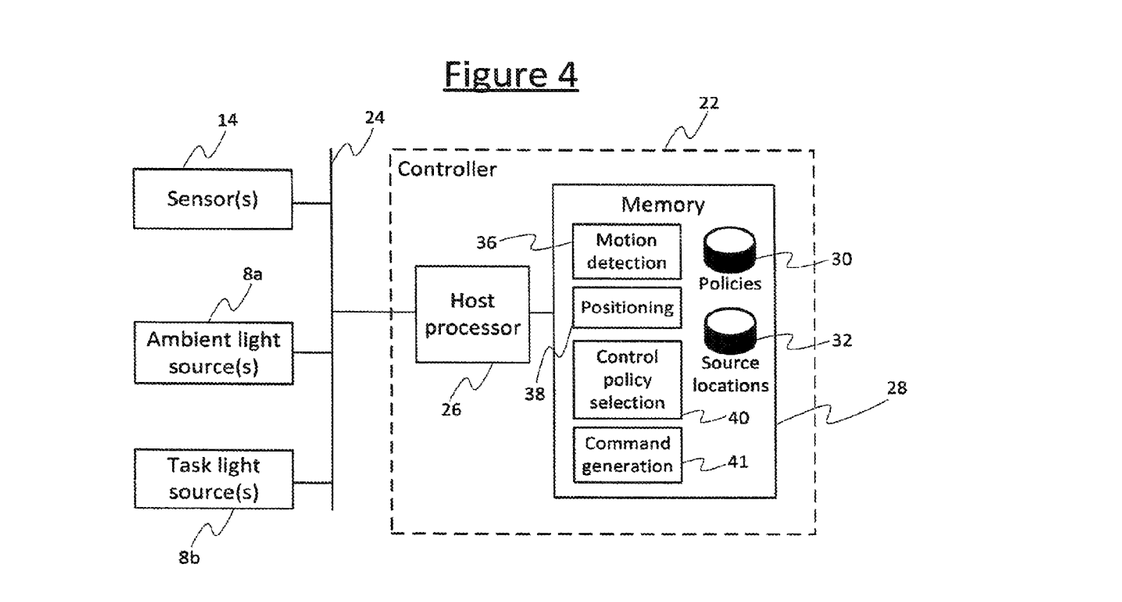
FIG. 4 is a schematic block diagram of a lighting system.

FIG. 4 is a schematic block diagram of a lighting system including control functionality. The lighting system comprises the one or more sensors 14, the light sources 8, and a controller 22 connected together by a suitable interconnect system 24 comprising one or more wired or wireless channels, such as an I$^2$C bus, a DMX bus, a DALI bus, Ethernet connection Wi-Fi connection or ZigBee connection. The controller 22 is arranged to receive sensed information from the sensor(s) 14 via the interconnect system 24, and to output control commands to the light sources 8 via the interconnect system 24 in order to control the light sources 8. In embodiments the light sources 8 may comprise different kinds of light sources such as ambient lighting 8a (illuminating the space 8 generally) and task lighting 8b (targeted on a specific area within the space 4 such as a work surface, e.g. desk).

The controller 22 comprises: motion detection logic 36, positioning logic 38, control policy selection logic 40, and command generation logic 41. In embodiments each of these is implemented as a portion of code stored on a memory 28 comprising one or more storage media, and arranged to be executed on a processor 26 comprising one or more processing units. Note therefore that the term logic does not imply hardware circuitry (though that would be an alternative implementation for some or all of the logic).

The positioning logic 38 is arranged to receive sensed information from at least one of the one or more sensors 14, to process that information to determine a position (location and/or orientation) of a user 12 in the space 4, and to output an indication of the detected position to the control policy selection logic 40. The motion detection logic 36 is arranged to receive sensed information from at least one of the one or more sensors 14, to process that information to detect a gesture performed by the user 12, and to output an indication of the detected gesture to the control policy selection logic 40. Note that processing in the sense of processing a signal from a sensor does not necessarily imply execution of software on a processor, though that is certainly one implementation.

Figure 5:
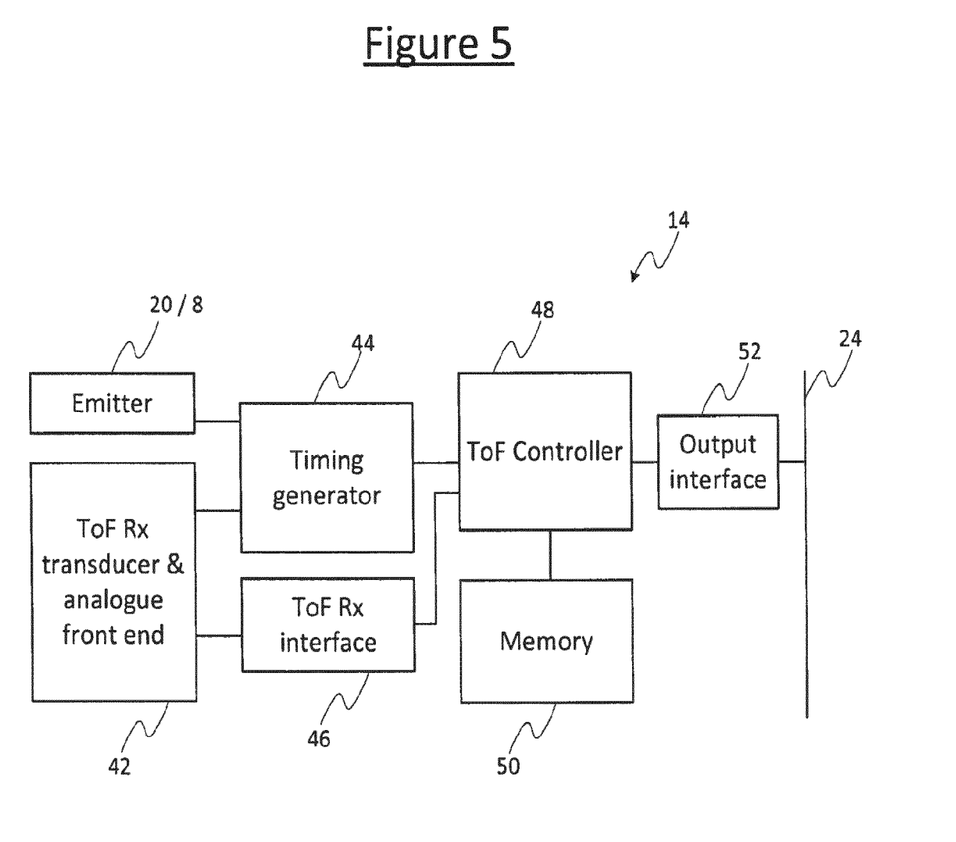
FIG. 5 is a schematic block diagram of a time-of-flight based sensing system.

FIG. 5 illustrates more detail of a time-of-flight (ToF) sensor 14 which can be used to determine user position and/or recognise gestures. The ToF sensor 14 comprises an emitter 20. The ToF sensor 14 also comprises a sensing element 42 in the form of a 3D ToF receiving transducer (e.g. the TI OPT8140), including an analogue front-end which interfaces with the sensing element, and suitable power management components. The 3D ToF sensing element 42 comprises a 2D array of pixel elements each operable to capture a respective pixel of image data, and at least some of these are also operable to capture the respective pixel in association with a respective time-of-flight, thus capturing 3D image data. Further, the ToF sensor comprises a ToF controller 48 (e.g. the TI OPT9110) which communicates with the host processor 26 of the lighting control system via an output interface 52 and the interconnect system 24. The ToF controller may take the form of a microcontroller running dedicated code stored on a local memory 50 of the ToF sensor 14. The received 3D ToF image information is provided from the sensing element 42 to the ToF controller 48 via a receiving interface 46.

Under control of the ToF controller 48, a timing generator 44 is used to synchronise the emission from the emitter 20 with the detection via the sensing element 42, either by controlling the emitter 20 to emit in synchronisation with the capture rate of the sensing element 42, or by controlling the sensing element 42 to capture data in synchronisation with the modulation of the radiation from the emitter 20, or by controlling both the sensing element and emitter together. Thus the relative timing of the emission and capture is known, so the ToF controller is able to associate time-of-flight information with the captured data.

In embodiments, the radiation used to sense time-of-flight may comprise non-visible radiation such as infrared, RF or ultrasound, or may comprise visible light. The radiation used to sense time-of-flight may comprise a certain identifier or signature so that it can be distinguished from other radiation in the environment, e.g. embedded with a certain code, or be given a characteristic waveform, frequency or spectrum. For example if the radiation is visible light then it may be embedded with an identifier by being modulated according to coded light techniques (e.g. see WO/127439), such that the ToF controller 48 can recognise it when received back from amongst the light from various other light sources. Alternatively if all the light sources 8 illuminating the space 4 are synchronised with the capture, then such an identifier or signature may not be required. In another alternative, the emitter 20 may be replaced with a suitable interface for synchronising the ToF sensing with pulsed emission by one or more of the light sources 8 (either via interconnect system 24 or a separate dedicated link).

The ToF controller 48 outputs the sensed information including the time-of-flight information to the host processor 26 via the output interface 52 and interconnect system 24. The host processor 26 may execute middleware (motion detection logic 36 and positioning logic 38) to recognise various gestures and also to identify the location of people 12 in the space 4, e.g. by means of facial recognition and/or other image recognition techniques. In embodiments, by tracking facial features or by analysing the movement of the user's limb(s), the sensed information may also be used to determine the orientation or the user 12.

As mentioned, other technologies also exist for use detecting the user's position and gesture, e.g. GPS to detect location and/or accelerometers to detect gestures.

Returning to FIG. 4, the control policy selection logic 40 is arranged to receive the detected position from the positioning logic 38 and detected gesture from the motion detection logic 36. The control policy selection logic 40 is also arranged to access a control policy database 30 and a commissioning database 32, which may be stored locally (on local memory 28) or remotely (e.g. on one or more servers accessed via a network such as the internet), or a combination of local and remote storage. The commissioning database 32 maps the respective locations of the light sources 8 against respective identifiers of those light sources 8. The control policy database 30 maps control policies to respective combinations of gesture and user position. Each database 30, 32 could take the form of any data structure, and a relatively small look-up table may suffice in the case of smaller lighting systems. Alternatively or additionally, in some implementations, analytical means of mapping may be used, i.e. an algorithm or formula, in place of either or both of these databases 30, 32. The following will be described in terms of a database implementation, but it will be appreciated that the teachings extend to other implementations.

In embodiments the control policy database 30 defines the operating zones which are utilised by the lighting controller 22. These may be expressed in a number of ways: (i) as a measure of distance between the user and the known location of one of the light sources 8 comprised by the lighting system, (ii) as a measure of distance between the user 12 and the ToF emitter 20 (or 8) and/or receiver 42, (iii) as a measure of the luminance received by a handheld device (e.g. smartphone) held by the user, and/or (iv) as a measure of the user's distance and orientation relative to light sources 8 controlled by the lighting system using an image acquired by the users smartphone (or similar) and processed such that the user's likely position and orientation can be computed. For example the control policy database 30 may define the lighting control functionality associated with one or more gestures at one of more distances from the ToF emitter and/or detector.

The commissioning database 32 contains the respective locations of the commissioned light sources 8 relative to the ToF emitter 20 (or 8) and/or detector 42. It will be appreciated that given a known absolute location for the ToF emitter and/or detector, and a known absolute location for the light sources 8, the relative distance may be computed. The locations of the light sources 8 in the commissioning database 32 may be used by the control policy logic 40 to determine positional demarcations or implement policies that are based on the position of the user relative to one or more of the lights sources 8. Optionally the commissioning database may also comprise information on the layout of the space 4 or obstacles in the space 4, for use in assessing positional demarcations specified based on which light sources are in a user's field of view.

An administrator may configure the system. This may comprise of a number of steps including: entering an administration mode, selecting and loading existing control policies in the policy database 30, and creating new control policies in the policy database 30. For example new control policies may be created by the administrator using a graphical user interface whereby the administrator can select from a range of icons representing different gestures and the magnitude and other characteristics of these gestures, and associate these with various zones within the area where users are to have control of the lighting system. Zones or other positional demarcations may be defined in a number of ways, e.g. based on the light sources 8 within the user's field of view, and/or based on the proximity to the nearest light source 8. One or more gestures may also be defined in a number of ways, e.g. the user waves his or her arm up to increase lighting intensity, and waves the arm down to decrease lighting intensity. Such settings are stored in the policy database 30.

Based on the mapping in the control policy database 30, the detected position from the positioning logic 38, and the detected gesture from the motion detection logic 36, the control policy selection logic 40 selects the policy mapped to the detected position and gesture by the policy database 30. Further, the selection logic 40 may dynamically switch between control policies according to the operating context (as the user moves between zones, faces in different directions, and/or performs different gestures). The control policy selection logic 40 duly outputs an indication of the parameters of the selected policy to the command generation logic 41, which issues one or more commands over the interconnect system 24 in order to control the lighting 8 in accordance with the selected policy, and with the detected position and gesture.

To aid understanding, below are several simplified examples of control policies which, in various embodiments, may be comprised by the policy database 30.

| Positional demarcation | Gesture | Policy |
| --- | --- | --- |
| Proportional zone, one or more light sources within field of view | User raises hand | Dim up only those light sources which are within the field of view (e.g. 120 degrees), proportionally according to how far they are located from the user, and also in proportion to magnitude of gesture. |
| | User lowers hand | Dim down only those light sources which are within the field of view (e.g. 120 degrees), proportionally according to how far they are located from the user, and also in proportion to magnitude of gesture. |
| Proportional zone, no light sources within field of view | User raises hand | Dim up only the light source 8 nearest the user, in proportion to magnitude of gesture. |
| | User lowers hand | Dim down only the light source 8 nearest the user, in proportion to magnitude of gesture. |
| Macro zone (irrespective of field of view) | User raises hand | Dim up all light sources in the space 4 uniformly, in proportion to magnitude of gesture. |
| | User lowers hand | Dim up all light sources in the space 4 uniformly, in proportion to magnitude of gesture. |

30

An example of the effect created by lighting control policy for the above-defined proportional zone 18 is illustrated schematically in FIG. 1. Here, the lights are controlled in a distribution that is a function of the user's location and direction. The user controls only those light sources 8 within his or her field of view, shown shaded in the figure. Optionally a range limit may also be imposed on the distance from the user, so those lights sources beyond a certain radius are not controlled. Further, the lights are dimmed according to a gradated spatial distribution, whereby the light sources 8 in field of view are dimmed in proportion to their separation in terms of distance from the user 12. That is, for a given magnitude of gesture, the user has a greater influence on those of the field-of-view light sources 8 that are physically closer to the user than those that are further away. This is also illustrated schematically in FIG. 1, with the shading of the most influenced light sources being shown densest and the shading of the least influenced light sources 8 being shown sparsest. The influence could also vary with angular separation from the direction the user is facing.

An example of an alternative control policy that could be applied in a proportional zone 18 is illustrated schematically in FIG. 3. Here the lighting distribution applied in the proportional zone is not a function of field of view, but is still a function of user location. The user controls all (and only) those light sources 8 that are within a predetermined range threshold, e.g. a threshold on radius from the user 12 such that the controlled light sources 8 roughly form a circle or ring around the user 12. Of those light sources 8 that fall within this range, the light sources 8 are dimmed in proportion to their respective distance from the user 12. Similarly to FIG. 1, the controlled light sources 8 and the degree of influence are represented schematically by the shading in FIG. 3.

In an example use case, user A is in a room 4. He makes a "brightness gesture" whilst standing immediately under a luminaire 8. The luminaire 8 he is standing under changes in intensity, however all other luminaire's in the room remain unchanged. User A then moves to one end of the room 4 and looks into the corridor 6. User A then again makes a brightness gesture whilst looking towards the corridor 6 (either the same or a different gesture depending on what is defined in the policy database 30). The intensity of light in the corridor 6 is changed. User A then turns around and looks towards the room 4 which is illuminated by multiple luminaires 8. He again makes a brightness gesture. The intensity of all lights is changed in the room 4.

In another example use case, user B is leaving a room 4 and wishes to turn off all the lights in the room 4, but as the room is very large then this means many of the light sources in that room 4 do not influence the illumination at her particular location, and so under the "proportional policy" applied in most of the room her gesture would not control all the light sources 8 in the room 4. Therefore, the user moves to a macro zone 18 adjacent to the door 10 and makes an "off gesture". All lights in the room 4 are turned off.

Figure 6:
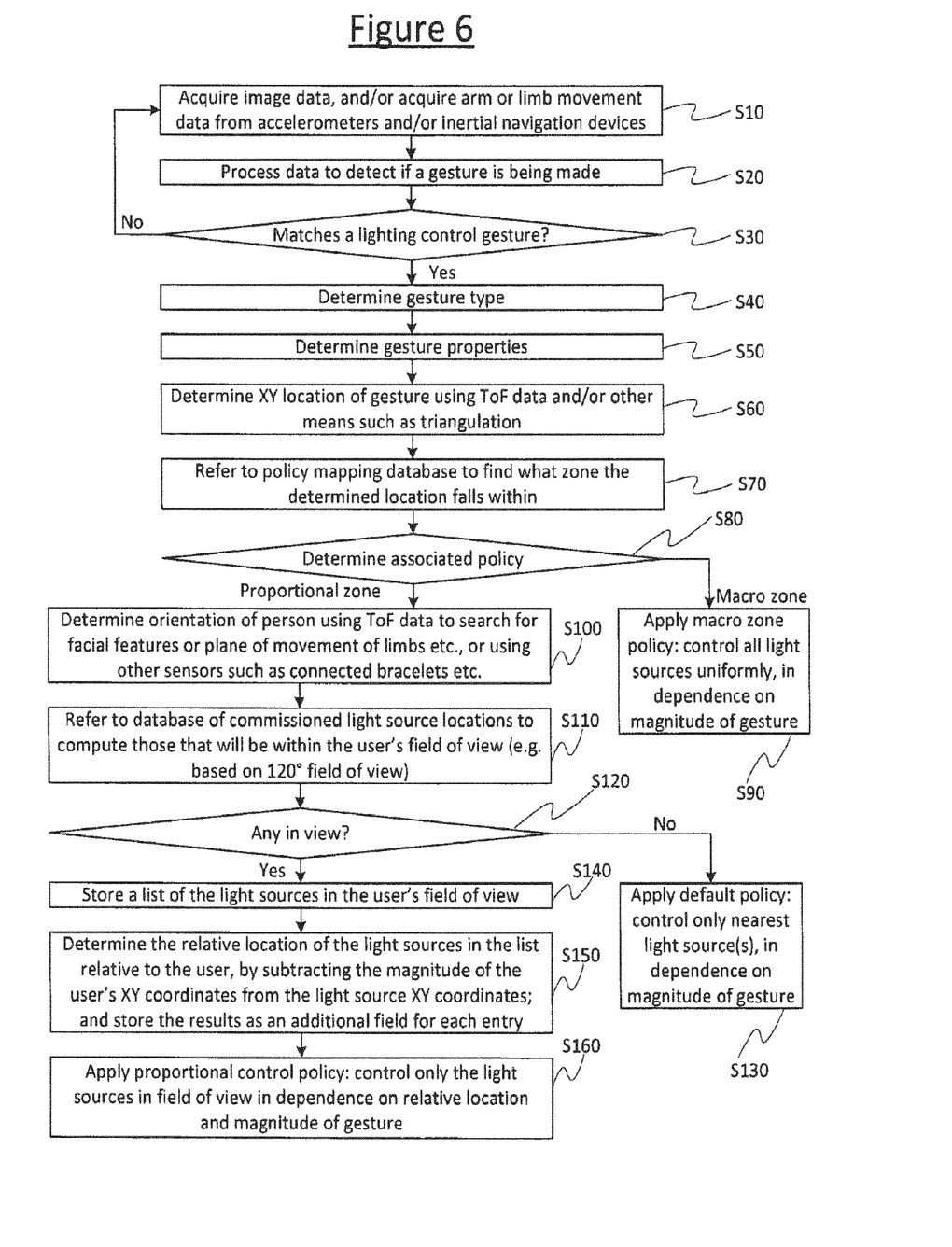
FIG. 6 is a schematic flow chart of a gesture based control method.

An example algorithm for implementing embodiments of the present disclosure is described below with reference to the flow chart of FIG. 6.

At step S10, data is acquired from one or more sensors 14, such as image data from a time-of-flight imaging sensor, and/or data from one or more accelerometers worn by the user. Another example would be data received from a device such as an inertial navigation device which uses GPS and accelerometers.

At step S20, the motion detection logic 36 processes some or all of the sensed data to determine whether an identifiable gesture is being performed by a user. This may comprise determining whether the data is consistent with a gesture from amongst a set of predetermined gestures that the motion detection logic 36 is configured to recognise. If not the motion detection logic continues processing sensed data at step S10, but if so then at step S30 the control policy selection logic 40 determines whether the identified gesture matches a gesture associated with a lighting control policy. This may comprise whether there is a match from amongst one or more gestures associated with a plurality of control polices in the policy database 30. If not, the algorithm loops back to step S10. If so, the algorithm proceeds to step S40.

At step S40 the control policy selection logic 40 determines a type of the gesture, e.g. whether it is a signal to raise or lower the lights, e.g. by raising or lowering the hand, or "dialing" around some or all of the circumference of an imaginary circle in the air. At step S50 the selection logic 40 also determines any relevant properties of the gesture such as its magnitude, e.g. how far is the hand raised or lowered, or through what degree of arc is the imaginary circle dialed. Thus the control policy selection logic 40 determines the lighting action and magnitude being requested by the user's gesture.

At step S60 the positioning logic 38 processes some or all of the sensed data to determine the coordinates of the user 12 in the space 4, for example a point in a horizontal plain parallel with the floor, e.g. in terms of Cartesian X and Y coordinates. For example this may be done based on data from a time-of-flight imaging sensor, and/or based on multilateration between reference nodes such as GPS satellites or land-based anchor nodes. At step S70, the control policy selection logic 40 uses these coordinates to determine which of a plurality of zones (e.g. 16 or 18) specified in the policy database 30 the user's current location falls within.

At step S80 the control policy selection logic 40 refers to the control policy database 30 to determine which control policy is associated with the detected gesture type and zone.

If it is determined that the user is in a macro zone 16, the algorithm branches to step S90 where the control policy selection logic 40 selects to apply the macro zone control policy. For example the macro zone could be a 1 m² area adjacent to the door 10. Based on this selection, the command logic 41 formulates a suitable command or commands (depending on the protocol of the interconnect system 24) causing all the light sources 8 in the relevant space 4 to be controlled in accordance with the response defined by the selected control policy, e.g. to dim them all up or down uniformly in proportion to the magnitude of the user's gesture.

If it is determined that the user is in a proportional zone 18, the algorithm branches to step S100 where the positioning logic determines the orientation of the user 12, e.g. based on the ToF image data and/or based on another type of sensor such as a magnetometer disposed about the user's person. Based on the detected orientation of the user and an assumption of a certain field of view, e.g. a 120° wedge in the horizontal plane, then at step S110 the control policy selection logic 40 computes which light sources 8 stored in the commissioning database 32 will be in the user's field of view.

At step S120, the selection logic 40 determines whether any light sources 8 are currently in the field of view. If not, the algorithm branches to step S130 where the control policy selection logic 40 selects to apply a default control policy, e.g. it determines which light source 8 is (or which small subset of light sources 8 are) closest in proximity to the user 12, and allows the gesture to control only that light source(s) 8. Accordingly, the command logic 41 formulates a command or commands controlling the relevant light source(s) 8, e.g. to dim it or them up or down in proportion to the magnitude of the user's gesture (uniformly or in some distribution in the case of a small subset).

If on the other hand it is determined that one or more light sources 8 are within the user's field of view, the control policy selection logic 40 stores a list of those light sources 8, the list providing a temporary database of light sources in field of view. At step S150, the policy selection logic 40 also determines the distance of the light sources 8 in this list relative to the user by subtracting the magnitude of the user's XY coordinates from the light source XY co-ordinates, and stores the results as an additional field for each entry in the list. At step S160, the control policy selection logic 40 selects to apply the proportional control policy, e.g. whereby the degree of influence is not only in proportion to the magnitude of the gesture but also in proportion to the distance of the controlled light sources 8 from the user's location and/or the angular deviation from their orientation. The command logic 41 formulates a command or commands to control only the light sources 8 in field of view in accordance with the selected control policy.

The above steps may be iterated periodically on a time driven basis, or may be iterated on an event driven basis.

Note that all these steps do not necessarily have to be performed in the order in which they are listed above (though that is one possible embodiment). Also in embodiments all steps above do not necessarily have to be included (though again that is one possible embodiment). In an alternative embodiment for example, the different zones do not necessarily have to implemented, in which case the steps S60-S90 may be omitted so that step S100 follows step S50. Alternatively the field of view need not necessarily be taken into account, in which case steps S100-160 may be omitted, and step S80 may select between the macro policy and one or more alternative policy. Instead for example, in a proportional zone 18 the light sources 8 could be controlled in a pattern around the user's location, e.g. as shown schematically in FIG. 3.

Another possibility for either the location-centric or field-of-view centric distributions applied in the proportional zone 18 is that all light sources 8 in the space 4 are controlled, but not uniformly (unlike in the macro zone 16)—i.e. the light sources 8 in the space 4 are still controlled such that the influence of the gesture decreases with the light sources' separation from the user's position, but no absolute distance threshold or angular threshold is imposed within the space 4 (e.g. room) beyond which the gesture would have no influence. For example the intensity may decrease radially from the user's location all the way to the edges of the room 4, or those light sources 8 within field of view may be controlled selectively or preferentially but not exclusively, such that the gesture influences them to a greater degree than those outside the field of view.

In further embodiments, the control policy selection logic 40 may additionally be configured to apply one or more multi-user arbitration rules to deal with the possibility that two or more users are detected in the same space 4 (e.g. same room) and both attempt to gesticulate conflicting operations at the same time. Any of the above sensing and detection operations may be applied for detecting the position and/or gesture performed by one or more other users in the space 4. Based on this, the control policy selection logic 40 may be configured to determine the relative position (relative distance and/or orientation) between two or more users performing gestures, and to moderate the application of a control policy in accordance with the one or more arbitration rules. For example, if the user 12 is in the proportional zone 18 and can observe more than one light source 8, the control he or she has on the light sources 8 which affect other users may be reduced according to the relative effect the light has on (i) the user which makes the gesture and (ii) the other user(s). E.g. if one or more other users would be affected more greatly by the operation of one or some of those light sources (e.g. because they are closer), then such light sources may be excluded from those being controlled in the space 4, or influenced to a lesser degree than they would have been otherwise.

It will be appreciated that the above embodiments have been described only by way of example. While embodiments have been illustrated and described in detail in the drawings and foregoing description, such illustration and description are to be considered illustrative or exemplary and not restrictive, and the invention is not limited to the disclosed embodiments.

For instance, the scope of the disclosure is not limited to the specific policies and associations exemplified above. In embodiments, various combinations of some or all of the following may be implemented in the control policy database 30 (or other means of specifying control polices and associating the policies with positions and gestures).

The user's relative distance from one or more light sources 8, or other feature of a lighting system (e.g. the user's distance from an average of some or all of the system's light source locations). Example: the further a user is away, the less influence he or she has on task specific lights 8b, but the greater the influence he or she has on the general ambient lighting 8a.

The effect of a light source 8 or lighting system on the user's location.

EXAMPLE the less effect a light has on a user's location, the less control he or she has have over it.

The user's orientation. Example: the direction a user is looking in, and whether looking towards or away from a light source 8, affects his or her perception of the illumination provided by the light source 8.

The effect of a light source 8 or lighting system on other users' locations.

The magnitude of the user's gestures.

The user's absolute location within the space 4, and optionally the absolute location of other users in the space 4. Example: a user in a macro zone 16 may be given control of all lighting in the corresponding space irrespective of other users, while when two or more users are attempting control in a proportional zone 18 then arbitration rules may be applied.

In further embodiments, other gestures may be recognised and associated with control policies. For example, user defined shapes could be programmed into the control policy database by a user in accordance with his or her preference, e.g. so that tracing out shapes in the like a square, triangle and/or circle could be configured to invoke different functions such as changing the colour temperature of the lighting, requesting a status read-out, resetting the lighting system, etc.; and the function of these gestures can also be made dependent on position. For instance certain functions may only be allowed to be invoked when standing in a certain direction or zone, or by using the right gesture in the right room, etc.

Furthermore, the techniques disclosed herein are not limited to controlling lighting. In other applications, the controlled utility may for example comprise heating or air conditioning. For example, heating units or air conditioning units may be controlled in a distribution around the user's position, or only those units in field of view may be controlled, or all units in a building may be controlled on condition of performing the gesture in a macro zone.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A controller for controlling one or more sources of a utility to provide the utility into a space occupied by one or more users, the controller comprising:
    motion detection logic configured to process an input from a first sensor to detect motions of a user in said space, and to detect that the motions correspond to predetermined gestures performed by the user, the gestures being performed from different respective positions within said space;
    positioning logic configured to process an input from a second sensor to detect the respective position from which each of said gestures was performed by the user;
    control policy selection logic configured, based on an association associating each of a plurality of discrete control policies with a respective combination of predetermined gesture and positional demarcation within said space, to select different ones of the control policies associated with the detected gestures performed from each of the different detected positions in dependence on the respective detected position, each control policy defining a respective response of said utility to the respective associated gesture; and
    command logic arranged to control the one or more sources to provide the utility in accordance with the respective response of the selected control policy,
    wherein the detected position comprises at least a directional orientation of the user from which he or she performed the detected gesture, and the positional demarcation associated with one, some or all of the control policies comprises a respective directional demarcation; the control policy selection logic being configured to select said one of the control policies that is associated with the detected gesture and with the directional demarcation within which said directional orientation is detected to fall.

2. The controller of claim 1, wherein as well as the selection of the control policy being based on the detected position, the respective response defined by at least one of the control policies comprises a spatial distribution in the provision of said utility within said space wherein the spatial distribution is also a function of the detected position.

3. The controller of claim 1, wherein the detected position comprises at least a location within said space from which the user performed the detected gesture, and the positional demarcation associated with one, some or each of said control policies comprises a respective zone within said space; the control policy selection logic being configured to select said one of the control policies that is associated with the detected gesture and with the zone within which said location is detected to fall.

4. The controller of claim 1, wherein said association comprises at least two different ones of said control policies being associated with the same predetermined gesture but different respective positional demarcations, such that the same gesture is interpreted differently depending on position.

5. The controller of claim 1, wherein the response defined by at least one of the control policies is a matter of degree which depends on a magnitude of the detected gesture.

6. The controller of claim 1, wherein the one or more sources are one or more light sources arranged to illuminate the space, the utility being said illumination.

7. The controller of claim 6, wherein the detected position comprises at least a location within said space from which the user performed the detected gesture, and the positional demarcation associated with one, some or each of said control policies comprises a respective zone within said space; the control policy selection logic being configured to select said one of the control policies that is associated with the detected gesture and with the zone within which said location is detected to fall;
and wherein the sources are the plurality of light sources arranged to illuminate said space, and said zones comprise:
a first zone associated with a control policy whereby all the light sources illuminating the space are controlled in response to the detected gesture; and
a second zone associated with a control policy whereby only a subset of said light sources within a specified vicinity of the detected location are controlled in response to the detected gesture.

8. The controller of claim 6, wherein:
as well as the selection of the control policy being based on the detected position, the respective response defined by at least one of the control policies comprises a spatial distribution in the illumination provided into said space wherein the spatial distribution is also a function of the detected position, according to which the illumination decreases with separation from the detected position.

9. The controller of claim 8, wherein the detected position comprises at least a location within said space from which the user performed the detected gesture, and the positional demarcation associated with one, some or each of said control policies comprises a respective zone within said space; the control policy selection logic being configured to select said one of the control policies that is associated with the detected gesture and with the zone within which said location is detected to fall; and wherein said zones comprise:
a first zone associated with a control policy whereby the illumination from said light sources is controlled uniformly in response to the detected gesture; and
a second zone associated with a control policy whereby the illumination from some or all of the light sources is controlled according to said spatial distribution.

10. The controller of claim 8, wherein the detected position comprises at least a directional orientation of the user from which he or she performed the detected gesture, and the positional demarcation associated with one, some or all of the control policies comprises a respective directional demarcation; the control policy selection logic being configured to select said one of the control policies that is associated with the detected gesture and with the directional demarcation within which said directional orientation is detected to fall; and wherein the directional demarcations comprise:
a first directional demarcation corresponding to directional orientations in which one or more of the light sources are within a field of view of the user, the first directional demarcation being associated with a control policy whereby one or more of the light sources within the field of view are controlled in response to the detected gesture; and
a second directional demarcation corresponding to directional orientations in which none of said light sources are within the field of view of the user, the second directional demarcation being associated with a control policy whereby a default luminaire is controlled in response to the detected gesture.

11. The controller of claim 10, wherein:
as well as the selection of the control policy being based on the detected position, the respective response defined by at least one of the control policies comprises a spatial distribution in the illumination provided into said space wherein the spatial distribution is also a function of the detected position, according to which the illumination decreases with separation from the detected position; and
under the control policy associated with the first directional demarcation, a plurality of the light sources within the field of view are controlled according to said spatial distribution.

12. The controller of claim 1, wherein:
the input processed to detect said motion comprises an input from a time-of-flight imaging sensor, a camera, one or more accelerometers disposed about the user's person, and/or one or more rotational sensors disposed about the user's person; and/or
the input processed to detect said position comprises an input from a time-of-flight imaging sensor, said time-of-flight imaging sensor, a camera, said camera and/or a location system for locating a user device disposed about the user's person.

13. A system comprising the controller of claim 1, the one or more sources, the first sensor and the second sensor.

14. A computer program product for controlling one or more sources of a utility to provide the utility into a space occupied by one or more users, the computer program product comprising code embodied on a computer-readable medium and configured so as when executed on one or more processing units to perform operations of:
processing an input from a first sensor to detect motions of a user in said space, and to detect that the motions correspond to predetermined gestures performed by the user, the gestures being performed from different respective positions within said space;
processing an input from a second sensor to detect the respective position from which each of said gestures was performed by the user;
based on an association associating each of a plurality of discrete control policies with a respective combination of predetermined gesture and positional demarcation within said space, selecting different ones of the control policies associated with the detected gestures performed from each of the different detected positions in dependence on the detected position, each control policy defining a respective response of said utility to the respective associated gesture; and
controlling the one or more sources to provide the utility in accordance with the respective response of the selected control policy,
wherein the detected position comprises at least a directional orientation of the user from which he or she performed the detected gesture, and the positional demarcation associated with one, some or all of the control policies comprises a respective directional demarcation; the control policy selection logic being configured to select said one of the control policies that is associated with the detected gesture and with the directional demarcation within which said directional orientation is detected to fall.

* * * * *